United States Patent [19]

Holton et al.

[11] Patent Number: 5,040,925

[45] Date of Patent: Aug. 20, 1991

[54] METHOD FOR CONTROLLING PARTICULATE HAZARDOUS MATERIAL

[75] Inventors: Kenneth D. Holton, Aurora, Ohio; Robert Andrews, Langhorne, Pa.

[73] Assignee: Childers Products Company, Eastlake, Ohio

[21] Appl. No.: 509,094

[22] Filed: Apr. 16, 1990

[51] Int. Cl.5 .................................................. B09B 3/00
[52] U.S. Cl. ........................................ 405/129; 241/4; 427/212
[58] Field of Search .................... 405/128, 129; 241/4, 241/25; 427/154, 155, 212, 221, 222

[56] References Cited

U.S. PATENT DOCUMENTS

| | | |
|---|---|---|
| 3,675,403 | 7/1972 | Ruffo . |
| 3,678,657 | 7/1972 | Hale . |
| 4,600,414 | 7/1986 | Metcalfe et al. . |
| 4,604,111 | 8/1986 | Natale . |
| 4,693,755 | 9/1987 | Erzinger .................. 427/154 X |
| 4,705,429 | 11/1987 | Natale .................... 405/128 |
| 4,748,051 | 5/1988 | Songer et al. ............ 427/212 |
| 4,795,352 | 8/1988 | Strieter . |
| 4,801,312 | 1/1989 | Mateson . |
| 4,809,391 | 3/1989 | Soldatovic . |
| 4,863,638 | 9/1989 | Harper .................... 405/128 X |
| 4,897,121 | 1/1990 | Sasaki ..................... 241/25 X |

Primary Examiner—David H. Corbin
Attorney, Agent, or Firm—Pearne, Gordon, McCoy & Granger

[57] ABSTRACT

A method of controlling hazardous particulate material during the demolition of buildings containing such material in the form of a friable layer of paint applied to the surfaces thereof. The method includes coating the friable layer with a water-based, pressure-sensitive adhesive which penetrates into the friable layer and bonds with the hazardous material contained therein forming a substantially homogeneous mass which is non-friable. Subsequently, the building is demolished without removing the hazardous material, and the remains of the building are disposed of in any conventional landfill not restricted to hazardous material disposal.

16 Claims, 1 Drawing Sheet

METHOD FOR CONTROLLING PARTICULATE HAZARDOUS MATERIAL

BACKGROUND OF THE INVENTION

This invention relates generally to the control of hazardous materials, and more particularly to a novel and improved method of controlling friable hazardous materials (asbestos being only one of many possible materials).

PRIOR ART

In the past, before it was determined that asbestos was a severe health hazard, many paints were formulated using asbestos as a filler or binder. Consequently, many older buildings have extensive wall surfaces covered by asbestos-bearing paint. Further, in many instances, such paint has become friable and releases particles of hazardous asbestos material into the air when the paint is disturbed.

Consequently, when it has been necessary to demolish a part or all of a building structure, procedures have had to be followed to prevent the hazardous asbestos particles from being released into the environment, where they provide health hazards not only to the workers performing the demolition but also to anyone who might breathe the contaminated air.

Because of the hazardous nature of asbestos material, governmental regulations have been issued by the Environmental Protection Agency (EPA) specifying the manner in which such hazardous materials can be handled and disposed of.

Under such regulations, it has been necessary to remove the hazardous material from the building before the building can be demolished. Further, when the material is removed from the building, it must be collected in double bags and in filters and the like and then disposed of. Because it is then quite concentrated, it is classified as a hazardous material requiring disposal in special disposal sites for hazardous materials. Laws have been enacted requiring that disposal of hazardous materials in such specially regulated disposal sites require someone (usually the building owner) to be responsible for any damages resulting from the hazardous material. Consequently, such disposal is very expensive.

In order to protect workers involved in the removal of the asbestos-bearing paint, various equipment and procedures have been developed. Generally, it has been necessary to seal off a room and install fans to create a negative pressure and filters which collect the hazardous material as it is scraped off the walls. Further, the workers performing the scraping operation have been required to wear suitable respirators and protective clothing, which severely restrict their movement and are extremely uncomfortable. After scraping and cleaning up, it has usually been necessary to conduct a thorough inspection. Finally, after the hazardous material has been removed, the structure still has to be demolished.

U.S. Pat. Nos. 4,604,111; 4,765,352; 4,801,312; and 4,809,391 all disclose various procedures for such removal of hazardous material. Although the equipment and procedures described in some of these patents have been recognized as acceptable under current safety regulations, they all involve considerable expense and delay. Further, because the material removed has to be disposed of as hazardous waste additional expenses are encountered.

It is also known to provide filtration utilizing a tacky surface to capture particulate matter. U.S. Pat. Nos. 3,675,403; 3,678,657; and 4,600,414 all describe such systems.

SUMMARY OF THE INVENTION

The present invention provides a novel and improved method of safely controlling hazardous particulate material such as asbestos during and after the time a building containing such material is partially or completely demolished. With the improved method, the cost involved in demolishing the building is greatly reduced and after demolition, the hazardous material is disposed with the remaining materials of the building in the conventional landfill not subject to higher cost hazardous waste regulations.

In accordance with the illustrated embodiment, the asbestos-bearing paint is coated with a permanent flexible pressure-sensitive adhesive which penetrates the paint and, in effect, captures and bonds with the paint material and the asbestos contained therein. Such coating renders even friable paint non-friable. Therefore, the asbestos is not released during its removal or when subjected to demolition processes.

Further, the adhesive coating has a tacky or sticky surface which captures airborne particles that inevitably exist or are created during the demolition process. When part or all of the building must be demolished, conventional demolition processes are then performed Since the coating securely holds the hazardous material it is not released into the atmosphere and remains bonded to the associated base material of the building.

As an additional benefit, the tacky surface also functions to capture even non-hazardous dust materials which are normally a product of demolition.

After demolition, the concentration of the asbestos is sufficiently low and is rendered non-friable so that the asbestos, along with the other debris, can be safely disposed of in a conventional landfill not subject to hazardous waste regulations and expense.

The adhesive coating is preferably formulated to prevent it from leaching away in the landfill so that it continues to hold the asbestos, preventing it from escaping into the ground water, etc.

For maximum advantage the adhesive coating is selected to have the following properties:

(a) penetration into the substrate containing the asbestos material;

(b) flexibility;

(c) strength to continue to hold the hazardous material during its removal or during demolition;

(d) a tacky surface which continues tacky for an extended period of time;

(e) resists leaching away when subjected to ground water conditions and the like;

(f) water-based to eliminate problems encountered when using hydrocarbon solvent-based materials.

One such pressure-sensitive adhesive which has been successfully used in accordance with this invention includes:

| | |
|---|---|
| acrylic latex emulsions (53% solids and 47% water) | 93 to 98.5% |
| low molecular weight alcohol (less than 74 molecular weight) | 1 to 5% |

| -continued | |
|---|---|
| pigment dispersion | 0.5 to 2% |

These and other aspects of this invention are illustrated in the accompanying drawings and are more fully described in the following specification.

DETAILED DESCRIPTION OF THE DRAWINGS

Figure 1:
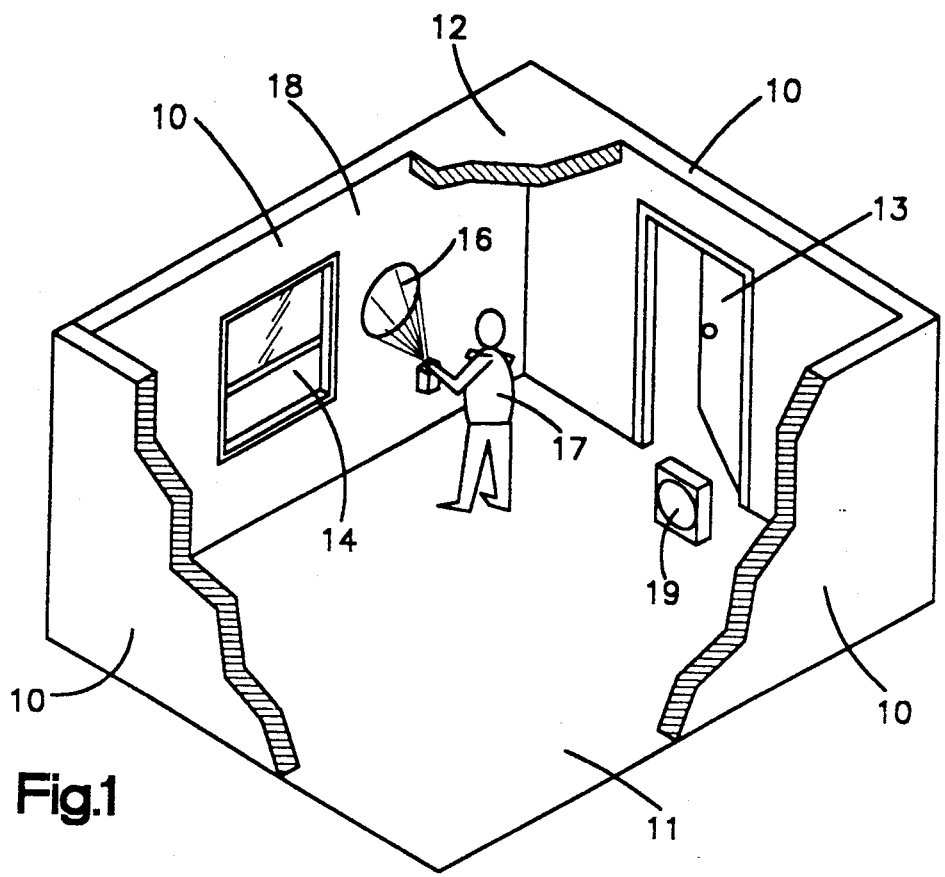
FIG. 1 is a schematic, perspective view illustrating one manner in which the adhesive coating can be applied to a wall covered with a friable paint containing asbestos particles.

FIG. 1 schematically illustrates a room of a building having walls 10, a floor 11, and a ceiling 12. Typically, such a room will also have one or more doors 13 and one or more windows 14.

Any or all of the surfaces of the walls 10, floor 11, ceiling 12, and door 13 may be coated with a paint containing hazardous particles, such as asbestos. Further, in many instances, the asbestos-bearing coating may have aged and become friable so that a hazardous condition would occur during the demolition of a building containing such a room. During such demolition the friable coating containing asbestos fibers or other hazardous particles tends to be released into the atmosphere, producing a severe health hazard to workers conducting the demolition and also to others when the particles are released into the atmosphere.

As mentioned previously, the practice has been to scrape away the friable coating prior to demolition and to collect the scraped material in double bags and collect the airborne particles in high quality filter apparatus. Such scraping removal is time-consuming and very expensive. Further, it has been necessary in the past to wear protective clothing and to seal off the rooms during the removal process, causing considerable discomfort to the workers.

In accordance with the present invention, such a procedure is not required. As schematically illustrated in FIG. 1, an adhesive coating 16 is applied by a worker 17 to any surface 18 of the room on which a coating containing hazardous particles exists. Such adhesive may be applied by a spray gun, a brush, or a roller. Normally, in large projects, however, spray applications are most efficient, and are preferred.

Because the application of the adhesive does not cause the friable coating to be released into the atmosphere, such application can be performed without elaborate sealing of the room in which the adhesive coating is being applied. As in any spraying operation, however, it is desirable to provide ventilation in the room by first opening the window 14 or the door 13. Preferably, the adhesive is a water-based adhesive devoid of any substantial amounts of organic solvents and the like to minimize the tendency for a health hazard to exist with respect to the worker 17. Further, in instances in which limited natural ventilation is available, simple floor fans 19 may be placed in the room to improve the ventilation therein. However, since the hazardous particulate material is not released by the coating process, it is not necessary to employ filters or the like, and, in many instances, natural ventilation is more than adequate. Although highly unlikely, in the event that the surfacing materials are disturbed prior to application of the coating, the worker would be adequately protected by wearing an approved NIOSH/MSHA half-face type air purifying respirator equipped with staged filters for asbestos dust and organic vapors, to prevent the worker from drawing any airborne adhesive material into his lungs. Also, disposable coveralls should be worn since the adhesive is very sticky.

Figure 2:
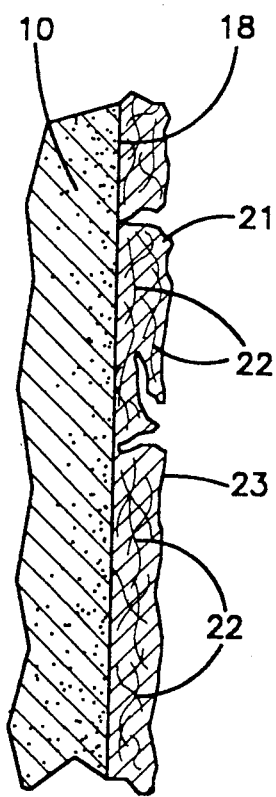
FIG. 2 is a greatly enlarged, schematic, fragmentary cross section illustrating the base wall and a layer of friable paint containing asbestos particles prior to the application of the adhesive coating.
Figure 3:
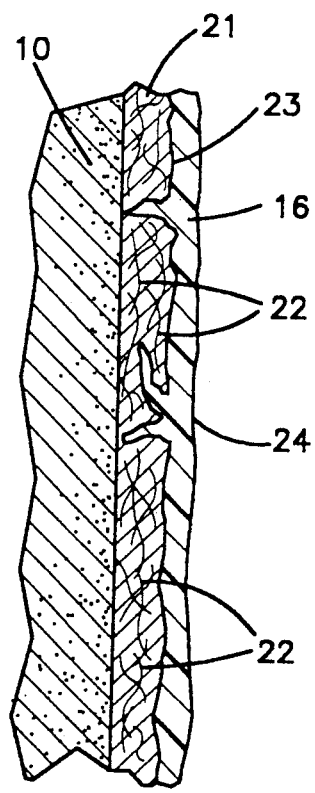
FIG. 3 is an enlarged schematic, fragmentary cross section similar to FIG. 2 but illustrating the structure immediately after the application of the adhesive coating.
Figure 4:
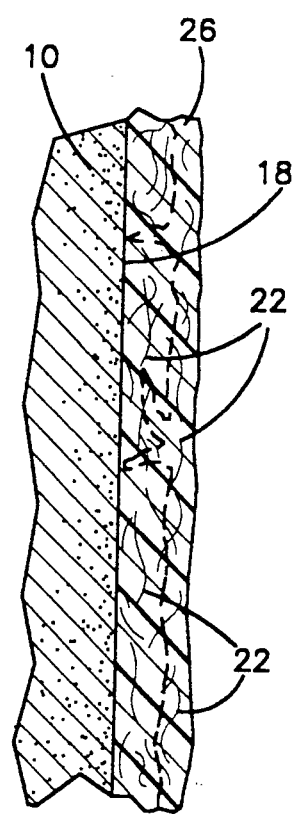
FIG. 4 is an enlarged, fragmentary cross section similar to FIGS. 2 and 3 but illustrating how the coating penetrates through the friable paint coating, forming a substantially homogeneous mass therewith.

FIGS. 2 through 4 schematically illustrate the coating during the process or method of the present invention. In FIG. 2 a wall 10 provides a surface 18 having a friable coating 21 thereon. Such coating is illustrated schematically as containing fibers or particles of asbestos 22. Even though the method of this invention is very well suited for working with coatings containing asbestos, it is applicable, in many instances, to coatings having other types of particulate hazardous materials.

FIG. 3 illustrates the wall 10 with a friable coating 21 thereon immediately after an adhesive coating 16 is applied. Initially the coating of adhesive 16 adheres to the surface 23 of the friable coating 21, and will tend to project into cracks or crevices therein. However, it is not essential that the adhesive provide sufficient flow to initially penetrate into very narrow cracks or crevices in the friable coating 21. The adhesive coating provides a tacky surface 24 which tends to capture any airborne particulate material, such as airborne asbestos and also any dust which might exist. The demolition of the structure can occur after the adhesive coating 16 is applied to all of the surfaces of the structure on which a friable hazardous particulate bearing coating exists.

Preferably, the demolition of the structure, however, is delayed until the adhesive coating 16 has time to penetrate or migrate into the friable coating and form a substantially homogeneous mass, as illustrated in FIG. 4. It has been found that the preferred adhesive in accordance with the present invention has the property of penetration into the friable paint coating to form a substantially homogeneous mass 26 consisting of the original friable coating 21 and the adhesive coating 16. As used herein, the term "homogeneous" is not intended to be strictly construed but, rather means a non-separable composition. Such homogeneous mass, of course, still contains the particles 22 of hazardous material such as asbestos. Further when the adhesive migrates into the friable coating, as illustrated in FIG. 4, it tends to form an improved bond with the surface 18 of the wall, etc. with the adhesive specified below, such penetration occurs with both water-based and oil-based paints, and is completed in about 24 hours. Further, such adhesive remains highly tacky.

One of the coatings which has been found to be particularly satisfactory is a pressure-sensitive adhesive having the property of maintaining a tacky surface for extended periods of time. Such adhesive includes:

| | |
|---|---|
| acrylic latex emulsions (53% solids and 47% water) | 93 to 98.5% |
| low molecular weight alcohol (less than 74 molecular weight) | 1 to 5% |
| pigment dispersion | 0.5 to 2% |

Such adhesive is a water-based adhesive, which is preferred, since it does not contain any significant solvents which can present hazardous health conditions to workers applying the adhesive. The adhesive specified above has the following properties:

(a) penetration into the substrate containing the asbestos material;
(b) flexibility;
(c) strength to continue to hold the hazardous material during its removal or during demolition;
(d) a tacky surface which continues tacky for an extended period of time;
(e) resists leaching away when subjected to ground water conditions and the like;
(f) water-based to eliminate problems encountered when using hydrocarbon solvent-based materials.

Because the asbestos particles are securely entrained in the homogeneous coating 26, they do not tend to be released or become airborne during the demolition of the structure. Consequently, typical demolition procedures can be followed without regard to the fact that hazardous material such as asbestos are present. Because the adhesive is flexible and tacky, it does not release during demolition and entraps airborne material during the demolition. Further, it is preferable to incorporate some pigment to help the worker applying the adhesive to establish that proper coverage is achieved.

Further, because the hazardous particulate material is not in the concentrated form and is reliably retained in the adhesive, it is satisfactory to dispose of the hazardous material along with the remainder of the structure in a landfill or the like which is not subject to hazardous materials disposal regulations. Additionally, because the adhesive is highly resistant to leaching in the presence of ground water, such typical landfill disposal can be utilized with safety.

With the present invention preparation of a structure for demolition can be accomplished quickly and at significantly less expense than when the preparation is performed in accordance with prior art methods. For example, it is not necessary to prepare a room by sealing it off. Further, blowers to establish a negative pressure and filters are not required. Still further, scraping and a careful clean-up, followed by an inspection, are not required. The preparation can be completed in much less time and with fewer workers. Such savings, of course, depend upon the size of the building but are very substantial. Further, additional substantial savings are realized because the material of the demolished structure including the coating material containing the hazardous particulate material can be disposed of in conventional landfills where disposal costs are minimal compared to disposal costs at landfills for hazardous materials.

Although the preferred embodiment of this invention has been shown and described, it should be understood that various modifications and rearrangements of the parts may be resorted to without departing from the scope of the invention as disclosed and claimed herein.

What is claimed is:

1. A method of controlling friable hazardous materials present on surfaces of structures during the demolition thereof, comprising coating said hazardous material with a flexible coating that bonds to said hazardous material and provides a flexible body to capture and resist crumbling and pulverization of said hazardous material during said demolition of said structure, and demolishing said structure while said hazardous material remains on said surfaces of said structures captured by said coating, said coating resisting release of said hazardous material during said demolition.

2. A method as set forth in claim 1, including selecting a flexible coating providing a tacky surface which captures airborne particles contacting said tacky surface.

3. A method as set forth in claim 2, wherein said hazardous material is in the form of a layer on said surfaces, including selecting a coating operable to permeate said layer and form therewith a flexible substantially homogeneous stable mass.

4. A method as set forth in claim 1, wherein said hazardous material is present in a friable layer, and selecting a coating operable to penetrate into said friable layer and form therewith a substantially homogeneous non-friable layer.

5. A method as set forth in claim 4, including selecting a material for said coating which is tacky during demolition and operates to entrap airborne particles contacting said coating.

6. A method as set forth in claim 5, including selecting a coating which is substantially free of organic solvents.

7. A method as set forth in claim 5, including selecting a water-based material for said coating.

8. A method as set forth in claim 7, including selecting a coating material having a high content of water-based acrylic latex emulsion.

9. A method as set forth in claim 7, including selecting a coating material having sufficient pigment to establish where said coating exists.

10. A method as set forth in claim 4, including selecting a material for said coating which resists leaching in the presence of ground water existing in landfills.

11. A method of preventing health hazards during the demolition of a building having surfaces covered with layers containing hazardous particulate materials, comprising applying a coating to such layer which penetrates said layer and bonds with said hazardous material so that hazardous material is prevented from becoming airborne during demolition, and thereafter demolishing said building without first removing said hazardous material from said surfaces of said building.

12. A method as set forth in claim 11, including selecting a material for said coating which forms a tacky surface and entrains airborne particles during demolition.

13. A method as set forth in claim 11, including selecting a material for said coating which is flexible, provides strength to continue to hold the hazardous material during its removal during demolition, provides a tacky surface which continues tacky for an extended period of time, resists leaching away when subjected to ground water conditions and the like, and is water-based and substantially free of organic solvents.

14. A method of demolishing and disposing of building structures comprising coating the surfaces of said structures with a pressure-sensitive adhesive providing a tacky surface, demolishing said structure while said adhesive remaining on said surfaces remains tacky and captures airborne particles released during said demolition, and disposing of the remains of said structure in a landfill which is not licensed for hazardous material disposal.

15. A method as set forth in claim 14, wherein said structure includes surfaces covered with friable layers containing hazardous materials, said method including coating said friable layer with a pressure-sensitive adhesive selected to render said friable layer non-friable during demolition.

16. A method as set forth in claim 15, including selecting a pressure-sensitive adhesive which continues to hold said hazardous material in said landfill.

* * * * *